(12) United States Patent
Uchimura

(10) Patent No.: US 9,338,422 B2
(45) Date of Patent: May 10, 2016

(54) DISPLAY CONTROL METHOD, RECORDING MEDIUM, DISPLAY CONTROL DEVICE

(75) Inventor: Kouichi Uchimura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 13/981,628

(22) PCT Filed: Feb. 8, 2012

(86) PCT No.: PCT/JP2012/052903
§ 371 (c)(1),
(2), (4) Date: Jul. 25, 2013

(87) PCT Pub. No.: WO2012/111513
PCT Pub. Date: Aug. 23, 2012

(65) Prior Publication Data
US 2013/0302014 A1    Nov. 14, 2013

(30) Foreign Application Priority Data

Feb. 15, 2011 (JP) .................................. 2011-029408

(51) Int. Cl.
*H04N 9/87* (2006.01)
*H04N 5/278* (2006.01)
*H04N 21/488* (2011.01)

(52) U.S. Cl.
CPC ............. *H04N 9/8715* (2013.01); *H04N 5/278* (2013.01); *H04N 21/4884* (2013.01)

(58) Field of Classification Search
None
See application file for complete search history.

(56) References Cited

U.S. PATENT DOCUMENTS

| 2002/0006165 A1* | 1/2002 | Kato ........................ 375/240.25 |
| 2003/0051226 A1* | 3/2003 | Zimmer et al. ................ 717/102 |
| 2005/0108466 A1* | 5/2005 | Takashima et al. ............ 711/100 |

(Continued)

FOREIGN PATENT DOCUMENTS

| JP | 2007-228181 A | 9/2007 |
| JP | 2009-301605 A | 12/2009 |
| JP | 4588120 B2 | 9/2010 |

OTHER PUBLICATIONS

International Search Report issued Apr. 24, 2012 in PCT/JP2012/052903.

(Continued)

*Primary Examiner* — Hung Dang
*Assistant Examiner* — Sunghyoun Park
(74) *Attorney, Agent, or Firm* — Oblon, McClelland, Maier & Neustadt, L.L.P.

(57) ABSTRACT

The present technology relates to a display control method, a recording medium, and a display control device with which a subtitle forced display function can be implemented on the basis of TTML (Timed Text Markup Language). TTML data in which predetermined attribute information pertaining to subtitle forced display is described in a tag defining an element of text is used. At a content playback side, control is performed on the basis of the predetermined attribute information in the TTML data, in such a way that characters based on text data designated by the tag in which the attribute information is written are displayed on a display unit regardless of whether a subtitle display setting is ON or OFF. Owing to this kind of configuration, text data serving as a predetermined text element from among text elements (text data serving as subtitles) within the TTML data can be displayed regardless of whether a subtitle display setting is ON or OFF. In other words, a subtitle forced display function can be implemented on the basis of TTML.

14 Claims, 7 Drawing Sheets

(56) References Cited

U.S. PATENT DOCUMENTS

| | | | |
|---|---|---|---|
| 2006/0140079 A1 | 6/2006 | Hamada et al. | |
| 2006/0221257 A1* | 10/2006 | Nakayama | 348/738 |
| 2006/0233531 A1* | 10/2006 | Toyama | G11B 27/102 386/241 |
| 2007/0058937 A1* | 3/2007 | Ando et al. | 386/95 |
| 2007/0102764 A1 | 5/2007 | Ando et al. | |
| 2007/0127892 A1 | 6/2007 | Ando et al. | |
| 2007/0127893 A1 | 6/2007 | Ando et al. | |
| 2007/0127894 A1 | 6/2007 | Ando et al. | |
| 2007/0127895 A1 | 6/2007 | Ando et al. | |
| 2007/0136375 A1 | 6/2007 | Ando et al. | |
| 2007/0140073 A1 | 6/2007 | Ando et al. | |
| 2007/0143267 A1 | 6/2007 | Ando et al. | |
| 2007/0143269 A1 | 6/2007 | Ando et al. | |
| 2007/0150912 A1 | 6/2007 | Ando et al. | |
| 2007/0150913 A1 | 6/2007 | Ando et al. | |
| 2007/0150914 A1 | 6/2007 | Ando et al. | |
| 2007/0150915 A1 | 6/2007 | Ando et al. | |
| 2007/0154167 A1 | 7/2007 | Ando et al. | |
| 2007/0154191 A1 | 7/2007 | Ando et al. | |
| 2007/0171559 A1 | 7/2007 | Ando et al. | |
| 2007/0172201 A1 | 7/2007 | Ando et al. | |
| 2007/0172213 A1 | 7/2007 | Ando et al. | |
| 2007/0174758 A1 | 7/2007 | Ando et al. | |
| 2007/0174759 A1 | 7/2007 | Ando et al. | |
| 2007/0196080 A1 | 8/2007 | Ando et al. | |
| 2007/0198515 A1 | 8/2007 | Ando et al. | |
| 2007/0198932 A1 | 8/2007 | Uchimura | |
| 2007/0204283 A1 | 8/2007 | Ando et al. | |
| 2007/0206924 A1 | 9/2007 | Ando et al. | |
| 2007/0206925 A1 | 9/2007 | Ando et al. | |
| 2007/0206926 A1 | 9/2007 | Ando et al. | |
| 2007/0230906 A1 | 10/2007 | Ando et al. | |
| 2008/0010648 A1 | 1/2008 | Ando et al. | |
| 2009/0303383 A1 | 12/2009 | Hamada et al. | |
| 2010/0250665 A1* | 9/2010 | Okamoto et al. | 709/203 |
| 2011/0033170 A1 | 2/2011 | Ikeda et al. | |
| 2012/0237181 A1 | 9/2012 | Ando et al. | |

OTHER PUBLICATIONS

Mike Dolan, et al. "Timed Text Markup Language (TTML) 1.0" W3C Recommendation, Nov. 18, 2010, 12 Pages.

Extended European Search Report issued Jul. 15, 2014 in Patent Application No. 12747245.4.

Jesus M. Barbero et al., "Production and Distribution Workflow for Closed Captioning", 2010 International Conference on Distributed Frameworks for Multimedia Applications (DFmA), XP-031893427, Aug. 2, 2010, 6 pages.

Anonymous, "Chapter 7.1: Content Element Vocabulary", Internet Citation, XP-003032757, Retrieved from the Internet: URL:http://www.w3.org/TR/2010/REC-ttaf1-dfxp-20101118, Nov. 18, 2010, 5 pages.

Office Action issued Oct. 7, 2014 in Japanese Patent Application No. 2011-029408.

* cited by examiner

FIG. 2

```
...
xmlns:x= new namespace
<tt>
  <head>
  ...
  </head>
  <body>
    <div>
      <p begin=0s dur=1s> abcdefg<span x:forced=true>hijk</span>lmn </p>
    </div>
  </body>
</tt>
```

FIG. 3

```
...
xmlns:x= new namespace
<tt>
  <head>
  ...
  </head>
  <body forced=true>
    <div>
      <p begin=0s dur=1s> abcdefghijklmn </p>
    </div>
  </body>
</tt>
```

FIG. 4

```
...
xmlns:x= new namespace
<tt>
  <head>
  ...
  </head>
  <body>
    <div forced=true>
      <p begin=0s dur=1s> abcdefghijklmn </p>
    </div>
  </body>
</tt>
```

FIG. 5

```
...
xmlns:x= new namespace
<tt>
  <head>
  ...
  </head>
  <body>
    <div>
      <p begin=0s dur=1s forced=true> abcdefghijklmn </p>
    </div>
  </body>
</tt>
```

FIG. 6

```
...
xmlns:x= new namespace
<tt>
<head>
<layout>
<region xml : id="r1" forced=true>
  ...
</region>
</layout>
</head>
<body>
<div>
  <p begin="0s" dur="1s" region="r1"> abcdefghijklmn </p>
</div>
</body>
</tt>
```

DISPLAY CONTROL METHOD, RECORDING MEDIUM, DISPLAY CONTROL DEVICE

TECHNICAL FIELD

The present technology relates to a display control method and a display control device for timed text subtitles, and to a recording medium on which data pertaining to timed text subtitles is recorded.

CITATION LIST

Non-Patent Document

Non-Patent Document 1: W3C (World Wide Web Consortium), "Timed Text Markup Language (TTML) 1.0", [online], 18 Nov. 2010, [searched 7 Feb. 2011], Internet <URL: http://www.w3.org/TR/ttaf1-dfxp>

BACKGROUND ART

Using timed text subtitles for the display of subtitles has been considered in the Internet delivery of videos for example and digital television broadcasting. In particular, the use of timed text subtitles in Internet delivery is supported by various types of standards such as DECE (Digital Entertainment Content Ecosystem LLC), for example.

There are numerous types of timed text; however, among these, W3C Timed Text proposed by W3C (World Wide Web Consortium), namely TTML (Timed Text Markup Language), shows promise in terms of the versatility and so on thereof (see the aforementioned Non-Patent Document 1, for example).

SUMMARY OF THE INVENTION

Problems to be Solved by the Invention

In this regard, it is normal for it to be possible for the display of subtitles carried out during the playback of video data to be designated to be ON or OFF by means of a user operation in advance. To be specific, the subtitle display setting of ON or OFF is designated by a user in advance, and subtitles are displayed or not displayed during video playback in accordance with the details of the subtitle display setting.

In contrast to this, ignoring the subtitle display settings implemented by the user and forcibly executing the display of subtitles has also been considered.

If the concept of this kind of subtitle forced display is applied, it is possible, in a predetermined position on a video, for a predetermined message serving as a warning card for example to be presented without fail to a viewer and, furthermore, for subtitles to be displayed corresponding only with scenes in which a foreign language is spoken, and so on, and it is possible for the range of use of subtitle functions to be expanded.

However, the subtitle forced display function of ignoring subtitle display settings and forcibly displaying a predetermined subtitle section is not supported in TTML.

The present technology takes this problem into consideration, and addresses the implementation of a subtitle forced display function on the basis of TTML.

Solutions to Problems

In order to solve the above problem, a display control method will be proposed.

The display control method according to the present technology includes a generation step of generating TTML (Timed Text Markup Language) data in which predetermined attribute information pertaining to subtitle forced display is described in a tag defining an element of text.

The display control method also includes a recording step of recording the TTML data generated by the generation step, on a required recording medium.

The display control method also includes an input step of inputting the TTML data recorded on the recording medium.

Further, the display control method includes a display control step of, on the basis of the predetermined attribute information in the TTML data input by the input step, performing control in such a way that characters based on text data designated by the tag in which the attribute information is written are displayed on a display unit regardless of whether a subtitle display setting is ON or OFF.

Owing to the aforementioned configuration, text data serving as a predetermined text element from among text elements (text data serving as subtitles) within TTML data can be displayed regardless of whether a subtitle display setting is ON or OFF. In other words, a subtitle forced display function can be implemented on the basis of TTML.

Effects of the Invention

Owing to the present technology, a subtitle forced display function can be implemented on the basis of TTML.

BRIEF DESCRIPTION OF DRAWINGS

FIG. 2 is a drawing for illustrating an example (exemplary description of attribute information for a <span> tag) of a TTML data generation technique serving as an embodiment.

FIG. 3 is a drawing in which an exemplary description of attribute information for a <body> tag is depicted.

FIG. 4 is a drawing in which an exemplary description of attribute information for a <div> tag is depicted.

FIG. 5 is a drawing in which an exemplary description of attribute information for a <p> tag is depicted.

FIG. 6 is a drawing in which an exemplary description of attribute information for a <region> tag is depicted.

MODE FOR CARRYING OUT THE INVENTION

An embodiment pertaining to the present technology is described hereafter.

It should be noted that the description is given in the following order.

<1. Summary of a display control technique>
<2. Specific example of TTML data generation>
<3. Display control device>
<4. Embodiment summary and modified example>

1. Summary of a Display Control Technique

Figure 1:
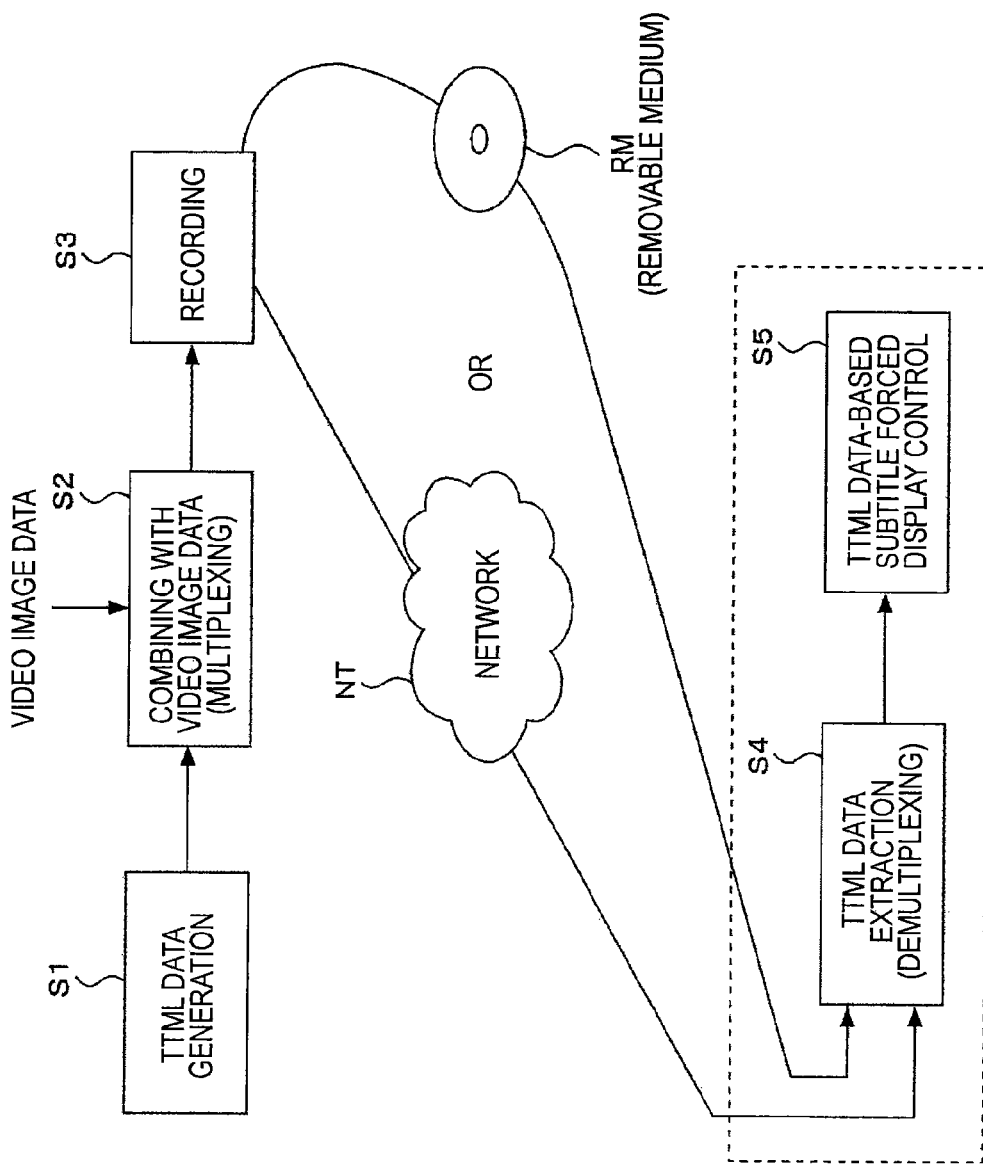
FIG. 1 is a drawing for illustrating a summary of a display control technique serving as an embodiment.

FIG. 1 is a drawing for describing a summary of a display control technique serving as an embodiment.

As shown in this FIG. 1, the display control technique of the embodiment can be broadly divided into the five steps of a TTML (Timed Text Markup Language) data generation step S1, a step S2 for combining with video image data, a recording step S3, a TTML data extraction step S4, and a TTML data-based subtitle forced display control step S5.

First, in the TTML data generation step S1, the generation of TTML data for implementing subtitle forced display is carried out.

TTML mentioned in this regard means W3C Timed Text (W3C: World Wide Web Consortium).

The TTML data generation step S1 is carried out using an information processing device such as a personal computer, for example. To be specific, a worker operating as a TTML data creator carries out an input operation for text and causes TTML data to be generated in the information processing device.

It should be noted that the specific generation technique (creation technique) for TTML data serving as an embodiment is described once more hereafter.

In the subsequent step S2 for combining with video image data, the TTML data generated in the step S1 and video image data are combined. To be specific, these video image data and TTML data are multiplexed to obtain stream data (delivery purpose-data) according to a predetermined format.

It should be noted that the format of the stream data can be a format based on MPEG-2 (MPEG: Moving Picture Experts Group) or MPEG-4 AVC (AVC: Advanced Video Coding), or the like.

The step S2 for combining with the video image data is also carried out using an information processing device such as a personal computer, for example.

In the following recording step S3, the delivery purpose-data serving as the stream data is recorded on a required recording medium.

For example, if delivery is to be carried out by way of a network NT such as the Internet, recording is carried out onto a recording medium such as a HDD (hard disk drive) or an SSD (solid state drive) that is provided in a predetermined delivery purpose-server device.

Alternatively, if delivery is to be carried out by distribution of removable media RM such as an optical disk or a memory card, recording is carried out onto the removable media RM.

In the subsequent TTML data extraction step S4, TTML data is extracted from delivery purpose-data input by way of a network NT or a removable media RM. That is, in this case, the extraction (demultiplexing) of TTML data is carried out from stream data serving as delivery purpose-data and in which video image data and TTML data have been multiplexed.

In addition, in the following TTML data-based subtitle forced display control step S5, control pertaining to subtitle forced display is carried out on the basis of the TTML data extracted in the step S4.

It should be noted that the specific details of the subtitle forced display control in the step S5 are also described once more hereafter.

In the case of the present example, the TTML data extraction step S4 and the TTML data-based subtitle forced display control step S5 are carried out using a display control device (playback device 1) that serves as an embodiment and is described hereafter.

2. Specific Example of TTML Data Generation

FIG. 2 is a drawing for illustrating an example of a TTML data generation technique serving as an embodiment.

In the present embodiment, TTML data in which predetermined attribute information pertaining to subtitle forced display is described in a tag defining an element of text is generated as TTML data for implementing subtitle forced display. In FIG. 2, an example in which the predetermined attribute information is described in a <span> tag is depicted as an example of a TTML data generation technique serving as this kind of embodiment.

To be specific, in the present example, the predetermined attribute information is written in the opening tag for the <span>. In the case of the present example, text data that is indicative of predetermined attribute information and also an attribute value associated therewith are described as the predetermined attribute information. To be more specific, "forced" serves as the text data that is indicative of predetermined attribute information, a boolean is employed for the attribute value with the two values of "true" and "false" being defined therefor, and "forced" and the attribute value are described in association with each other by means of an "=" sign.

By describing the new attribute information of "forced" in the opening tag of a <span> as described above, it is indicated that, within the text of "abcdefghijklmn" that is the text element defined (designated) by a <p> tag in the drawing, the text data of "hijk" that is the text element defined by the <span> tag is a target for forced display being ON or OFF.

The distinction between the forced display of the "hijk" being ON or OFF (forced display/non-forced display) is indicated by the distinction between the "true" or "false" attribute value associated with the "forced". To be specific, the attribute value "true" indicates forced display, and the attribute value "false" indicates non-forced display.

In this regard, the description of predetermined attribute information pertaining to subtitle forced display may be carried out with respect to a tag defining an element of text, and is not restricted to the <span> tag. For example, besides a <span> tag, the attribute information can also be described in <body>, <div>, <p>, and <region> tags.

FIG. 3 to FIG. 6 depict examples of TTML data in cases where the attribute information is described in <body>, <div>, <p>, and <region> tags, respectively.

By describing the attribute information in an arbitrary tag defining a text element, it becomes possible to indicate that the text element (text) designated by that tag is a target for subtitle forced display control. In other words, it becomes possible to freely select a text section that is a target for the subtitle forced display control by selecting a tag in which the attribute information is described.

3. Display Control Device

Figure 7:
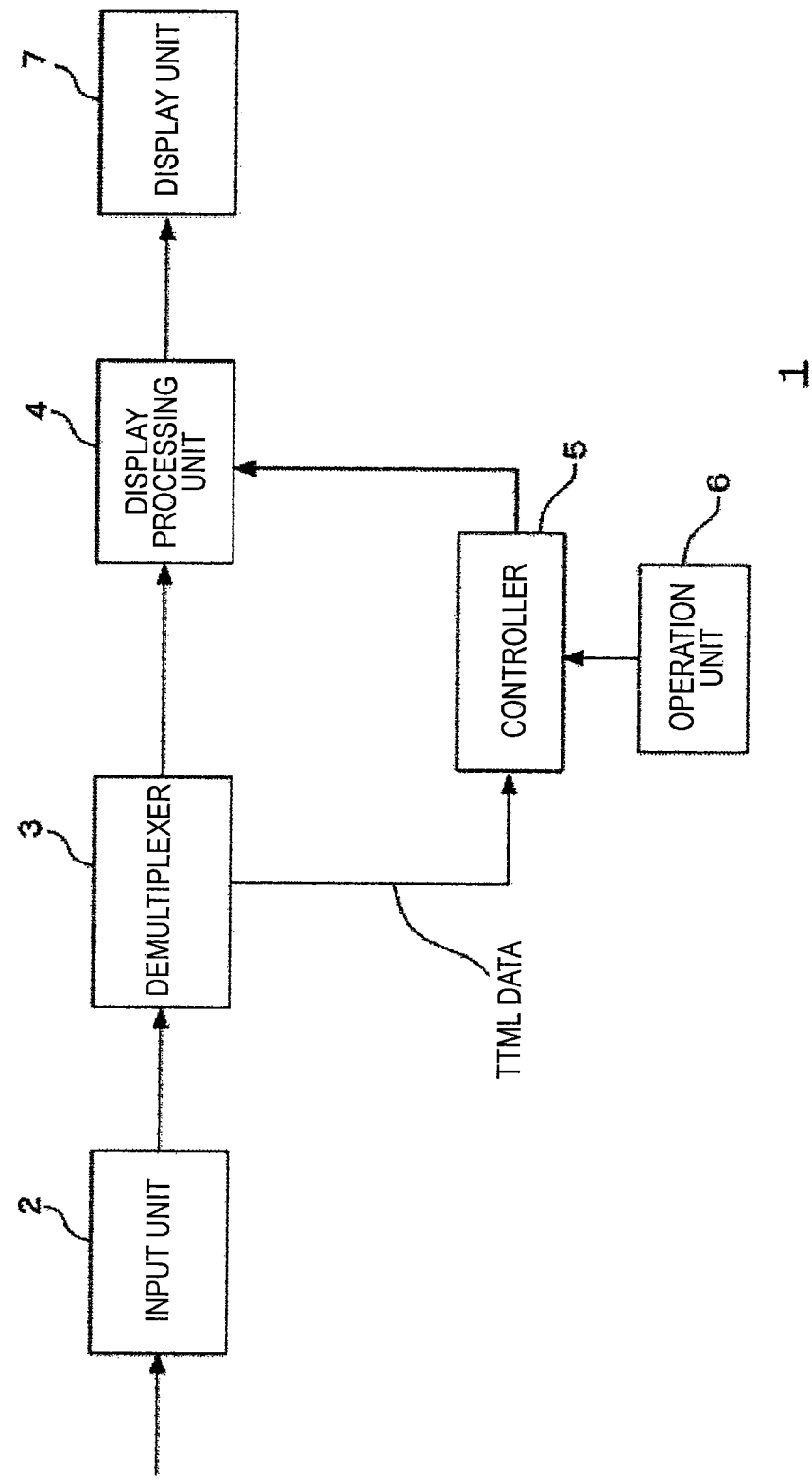
FIG. 7 is a drawing in which an exemplary configuration of a display control device of an embodiment is depicted.

FIG. 7 depicts an exemplary configuration of the playback device 1 serving as the display control device of an embodiment.

In FIG. 7, the playback device 1 is provided with an input unit 2, a demultiplexer 3, a display processing unit 4, a controller 5, an operation unit 6, and a display unit 7.

The input unit 2 is configured so as to input delivery purpose-data that is received by way of the network NT depicted in the preceding FIG. 1, or delivery purpose-data that is recorded on removable media RM.

The delivery purpose-data that is input by the input unit 2 is supplied to a demultiplexer.

The demultiplexer 3 demultiplexes the delivery purpose-data to thereby extract (separate) each of the video image data and the TTML data.

The video image data is supplied to the display processing unit 4, and the TTML data is supplied to the controller 5.

The display processing unit 4 carries out various types of processing for displaying, on the display unit 7, a video image based on the video image data and subtitles. In the case where a subtitle display setting described hereafter is ON, the display processing unit 4, on the basis of an instruction from the controller 5, carries out processing with which subtitle data based on TTML data is combined with video image data and displayed on the display unit 7.

The display unit 7 is a liquid crystal display or an organic EL display for example, and is display-driven by the display processing unit 4.

The controller 5 is constituted by a microcomputer provided with a CPU (central processing unit), a ROM (read-only memory), a RAM (random-access memory), and so on, and carries out overall control of the playback device 1.

In the case of the present example, the controller 5 carries out reception processing of a display/non-display setting (subtitle display setting) for timed text subtitles based on TTML data. To be specific, an instruction for whether a subtitle display setting is to be ON or OFF (display/non-display) is received on the basis of operational input by a user carried out by way of the operation unit 6.

Furthermore, in the case of the present example in particular, the controller 5 carries out timed text subtitle display control (namely normal subtitle display control processing) based on the described details of the TTML data and the details of the subtitle display setting, and also carries out processing pertaining to subtitle forced display control based on the aforementioned attribute information described in the TTML data.

Figure 8:
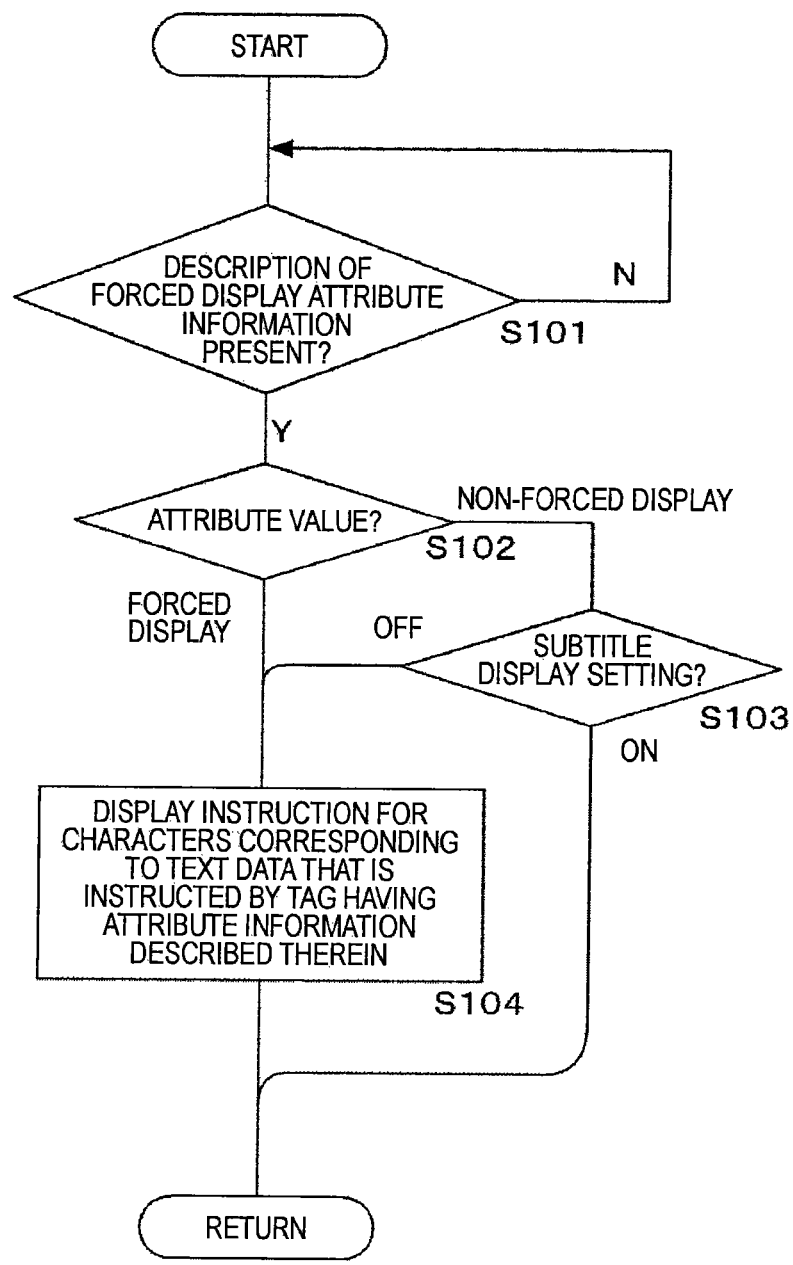
FIG. 8 is a flowchart in which specific steps for processing pertaining to subtitle forced display control based on TTML data is depicted.

FIG. 8 is a flowchart in which specific steps for processing pertaining to subtitle forced display control based on TTML data and carried out by the controller 5 are depicted.

It should be noted that the processing depicted in this FIG. 8 is executed by the controller 5 on the basis of a program stored in a memory such as the aforementioned ROM for example.

First, in step S101, processing for waiting until the description of forced display attribute information is detected is executed. In other words, waiting is carried out until the description of "forced" indicating forced display attribute information is detected in TTML data (in a tag) supplied from the demultiplexer 3.

If the description of forced display attribute information is detected, processing proceeds to step S102, and the determination of an attribute value is carried out. In other words, in the case of the present example, the determination of a "true" or "false" attribute value described in association with "forced" is carried out.

In step S102, if a determination result indicating that the attribute value is "false" is obtained, namely that the attribute value is a non-forced display instruction, processing proceeds to step S103.

Furthermore, in step S102, if a determination result indicating that the attribute value is "true" is obtained, in other words that the attribute value is a forced display instruction, processing proceeds to step S104.

In step S103, it is determined whether the subtitle display setting is ON or OFF.

In this step S103, if a determination result indicating that the subtitle display setting is ON is obtained, processing proceeds to "RETURN" as indicated in the drawing.

It should be noted that, for confirmation purposes, if the subtitle display setting is ON, subtitle display based on TTML data is carried out by means of normal subtitle display control processing carried out by the controller 5 in parallel with the processing depicted in FIG. 8.

On the other hand, in the step S103, if a determination result indicating that the subtitle display setting is OFF is obtained, processing proceeds to step S104.

In step S104, a display instruction for characters corresponding to text data instructed by a tag having attribute information described therein is carried out. In other words, the transfer of text data (subtitle data) and the display instruction therefor (combining instruction) instructed by a tag having attribute information described therein are carried out with respect to the display processing unit 4.

It should be noted that, during this process, the display instruction for subtitle data is carried out in such a way that the display timing for the subtitle data becomes a timing designated by the TTML data.

After the processing of step S104 has been executed, processing proceeds to "RETURN" as indicated in the drawing.

It should be noted that, in FIG. 7, an example is given of a configuration in which the playback device 1 is provided with the display unit 7 serving as a display; however, the display unit 7 may of course be provided externally. In other words, it is also possible for the playback device 1 to be configured with the display unit 7 depicted in the drawing being omitted.

4. Embodiment Summary and Modified Example

As described above, according to the display control technique of the present embodiment, a subtitle forced display function can be implemented on the basis of TTML.

Furthermore, in the present embodiment, by describing attribute information pertaining to forced display in a tag, it is possible to freely select a text section that is a target for subtitle forced display control by selection of the tag in which the attribute information is described.

In this regard, specific usage examples for a subtitle forced display function include a use in which a warning card for warning that, for example, unauthorized reproduction is prohibited is displayed in the opening section and so on of content such as a movie. In other words, application of the subtitle forced display function for messages or the like to be displayed at all times regardless of whether the subtitle display setting is ON or OFF, as with this kind of warning card, is effective.

During this process, in the conventional case where there is no subtitle forced display function, a warning card is inserted as part of a video image serving a movie. In other words, a warning card is inserted as a video image file.

A warning card in each different language should be inserted in accordance with the content delivery destination; however, when a warning card is inserted as a video image file in this way, a video image file has to be prepared for each language, and for that reason it is necessary for mass storage recording media to be prepared at the delivery source, and it is also liable that there will also be a resulting increase in cost pertaining to the creation of content due to the increase in workload.

In contrast to this, according to the present embodiment in which subtitle forced display is implemented on the basis of TTML, only text data serving as TTML data is retained for each language, and for that reason, a reduction in the amount of data required to be recorded and a reduction in cost pertaining to creation are achieved.

In this regard, for confirmation purposes, the steps/configuration for carrying out this kind of generation of TTML data for each language and the selection of subtitle display according to the desired language are described hereafter.

First, in this case, in the TTML data generation step S1 depicted in the preceding FIG. 1, TTML data is generated separately for subtitles of each language. Furthermore, in the step S2 for combining with video image data, delivery purpose-data in which these plurality of TTML data generated for each language and the video image data are multiplexed is generated, and in the recording step S3, the delivery purpose-data is recorded on a required storage recording medium (a recording medium of a delivery purpose-server device or a removable medium RM).

In the playback device 1 in this case, a language designation from a user is received by the controller 5 prior to the playback and so on of content serving as the video image data.

During playback, the controller 5 instructs the demultiplexer 3 to extract only TTML data corresponding to the designated language, and carries out subtitle forced display control that is the same as that previously described, on the basis of the TTML data extracted.

Forced subtitle display for the designated language is thereby implemented.

Alternatively, it is also possible for, as delivery purpose-data, data in which video image data and TTML data generated for one subtitle language are multiplexed to be generated separately for each subtitle language, and for these items of delivery purpose-data for each language to be recorded on a required recording medium.

At this point, in the case of network delivery, in accordance with a language designation from the playback device 1 side, a delivery purpose-server device is configured to send, to that playback device 1, delivery purpose-data corresponding to the designated language. Furthermore, in the case of delivery using removable media RM, removable media RM having delivery purpose-data created for the subtitle language of the country in question recorded thereon is distributed to each country.

At the playback device 1 side, it is therefore possible for subtitle forced display in a language corresponding to the country in question to be carried out.

If this kind of technique is employed, in comparison to when the aforementioned technique is employed, the amount of delivery data can be further reduced, a reduction in the amount of communication data is achieved in the case of network delivery, and furthermore a reduction in the amount of recording for the removable media RM is achieved if removable media RM is used.

It should be noted that the present technology is not to be restricted to the specific examples described up to this point.

For example, in the description up to this point, an example has been given in which an "attribute value" is described; however, it is also possible for the "attribute value" description to not be required.

To be specific, the description of an attribute value such as "true" or "false" is not required in the case when the description of predetermined data such as "forced", which is indicative of attribute information, in an arbitrary tag is defined as indicating that subtitle forced display is ON. In this case, if predetermined data pertaining to subtitle forced display such as "forced" is described in a tag, the playback device 1 is configured so as to carry out forced display of subtitle data designated by the tag in which the predetermined data is described.

In the case where an attribute value is described, it is necessary for "forced" and the attribute value therefor to be described also when forced display is OFF; however, in the case where the aforementioned technique is employed, it is not necessary for "forced" and the attribute value therefor to be described when forced display is OFF, and for that reason an increase in the efficiency of creation work for TTML data is achieved.

Furthermore, in the description up to this point, an example has been given of a case where the present technology is applied to network delivery for video image content and to delivery using removable media; however, the present technology can be suitably applied also to subtitle display for digital television broadcasting, for example.

Furthermore, the present technology can be suitably applied also to cases such as where, as targets for forced display, character information and an image based on bitmap data or the like are displayed together.

REFERENCE SIGNS LIST

1 Playback device, 2 Input unit, 3 Demultiplexer, 4 Display processing unit, 5 Controller, 6 Operation unit, 7 Display unit, NT Network, RM Removable medium

The invention claimed is:

1. A display control method comprising:
   generating TTML (Timed Text Markup Language) data in which predetermined attribute information pertaining to subtitle forced display is described in a tag defining an element of text;
   recording the TTML data generated by the generation step, on a required recording medium;
   inputting the TTML data recorded on the recording medium; and
   performing, via processing circuitry and on the basis of the predetermined attribute information in the TTML data input by the input step, control such that characters based on text data designated by the tag in which the attribute information is written are displayed on a display unit regardless of whether a subtitle display setting is ON or OFF,
   wherein the portion of characters of the text data being displayed on the display unit is determined based on a location at which the predetermined attribute information is located within the tag,
   wherein, in the generation step and when a video image file is being recorded to the recording medium,
      TTML data is generated for each subtitle of a different language and only text data is generated as TTML data, and
      delivery purpose-data is generated in which the text-only TTML data of each language and a single copy of the video image file are multiplexed.

2. The display control method according to claim 1, wherein the predetermined attribute information is described in such a way as to indicate whether forced display is ON or OFF in accordance with an attribute value described in association with data that is indicative of the attribute information.

3. The display control method according to claim 2, wherein,
   in the recording step, the delivery purpose-data is recorded on the recording medium, and
   in the input step, the video image file is separated from the delivery purpose-data, and also the TTML data for a designated language is selected from among the plurality of TTML data and is input.

4. The display control method according to claim 1, wherein, in the generation step, the predetermined attribute information is described in a <span> tag.

5. The display control method according to claim 1, wherein, in the generation step, the predetermined attribute information is described in a <body> tag.

6. The display control method according to claim 1, wherein, in the generation step, the predetermined attribute information is described in a <div> tag.

7. The display control method according to claim 1, wherein, in the generation step, the predetermined attribute information is described in a <p> tag.

8. The display control method according to claim 1, wherein, in the generation step, the predetermined attribute information is described in a <region> tag.

9. A non-transitory computer readable recording medium having computer-readable instructions stored thereon which when executed by a computer cause the computer to perform the method of claim 1.

10. The display control method according to claim 1, wherein the video image file is a warning card for unauthorized reproduction of content.

11. The display control method according to claim 10, where in the video image file is a warning card in each language for unauthorized reproduction of content.

12. A display control device comprising:
circuitry configured to
acquire TTML (Timed Text Markup Language) data in which predetermined attribute information pertaining to subtitle forced display is described in a tag defining an element of text; and
perform on the basis of the predetermined attribute information in the acquired TTML data, control such that characters based on text data designated by the tag in which the attribute information is written are displayed on a display unit regardless of whether a subtitle display setting is ON or OFF,
wherein the portion of characters of the text data being displayed on the display unit is determined based on a location at which the predetermined attribute information is located within the tag,
wherein, when a video image file is being recorded to the recording medium,
TTML data is generated for each subtitle of a different language and only text data is generated as TTML data, and
delivery purpose-data is generated in which the text-only TTML data of each language and a single copy of the video image file are multiplexed.

13. The display control device according to claim 12, wherein
the predetermined attribute information is described in such a way as to indicate whether forced display is ON or OFF in accordance with an attribute value described in association with data that is indicative of the attribute information, and
the circuitry controls whether subtitle forced display is ON or OFF in accordance with the attribute value.

14. The display control device according to claim 12, wherein
the circuitry separates the video image file from the delivery purpose-data, and also selects and acquires the TTML data for a designated language from among the plurality of TTML data.

\* \* \* \* \*